(12) United States Patent
Nadler et al.

(10) Patent No.: US 11,504,794 B2
(45) Date of Patent: Nov. 22, 2022

(54) METHODS AND APPARATUS FOR FORMING A PIERCE HOLE IN A WORKPIECE

(71) Applicant: The ESAB Group Inc., Florence, SC (US)

(72) Inventors: Michael Nadler, Wilmot, NH (US); Ryan Lynaugh, Cornish, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 402 days.

(21) Appl. No.: 16/732,440

(22) Filed: Jan. 2, 2020

(65) Prior Publication Data
US 2021/0205913 A1    Jul. 8, 2021

(51) Int. Cl.
| | |
|---|---|
| *B23K 10/00* | (2006.01) |
| *B23K 7/10* | (2006.01) |
| *B23K 9/013* | (2006.01) |
| *B23K 37/02* | (2006.01) |
| *H05H 1/36* | (2006.01) |

(52) U.S. Cl.
CPC ............ *B23K 10/006* (2013.01); *B23K 7/102* (2013.01); *B23K 9/013* (2013.01); *B23K 37/0258* (2013.01); *H05H 1/36* (2013.01)

(58) Field of Classification Search
CPC ........ B23K 7/102; B23K 9/013; B23K 10/00; B23K 10/003; B23K 10/006; B23K 37/0258; H05H 1/36; H05H 1/3494
See application file for complete search history.

(56) References Cited

U.S. PATENT DOCUMENTS

| | | | |
|---|---|---|---|
| 4,273,313 | A | 6/1981 | DeNardo |
| 4,954,688 | A | 9/1990 | Winterfeldt |
| 6,201,207 | B1 | 3/2001 | Maruyama et al. |

(Continued)

FOREIGN PATENT DOCUMENTS

| | | | |
|---|---|---|---|
| JP | S5964164 A | | 4/1984 |
| JP | S5976665 A | | 5/1984 |

(Continued)

OTHER PUBLICATIONS

Communication Relating to the Results of Partial International Search mailed with Invitation to Pay Additional Fees for International Application No. PCT /US2020/065041 dated Jun. 10, 2021, 13 pages.

(Continued)

*Primary Examiner* — Brian W Jennison
(74) *Attorney, Agent, or Firm* — Edell, Shapiro & Finnan, LLC

(57) ABSTRACT

Methods for forming pierce holes in a metal workpiece are disclosed. According to one implementation, upon a plasma torch be energized, the cutting axis of the torch is rotated repeatedly between first and second angular positions to produce successively deeper pierces in a workpiece until a pierce hole is produced through a thickness of the workpiece. According to other implementations pierce holes are produced by rotating the cutting axis of the plasma torch tip around a designated central axis of the pierce hole in a diametrically reducing manner so that the produced pierce hole has a tapered profile with a cross-sectional area of the pierce hole at a top surface of the workpiece being greater than a cross-sectional area of the pierced hole at a bottom surface of the workpiece.

25 Claims, 15 Drawing Sheets

(56) References Cited

U.S. PATENT DOCUMENTS

| | | |
|---|---|---|
| 7,087,855 B2 | 8/2006 | Yamaguchi et al. |
| 8,395,075 B2 | 3/2013 | Phillip et al. |
| 8,754,349 B2 | 6/2014 | Phillip et al. |
| 8,946,583 B2 | 2/2015 | Reimann et al. |
| 8,946,584 B2 | 2/2015 | Riemann et al. |
| 8,987,636 B2 | 3/2015 | Fagan |
| 9,687,933 B2 | 6/2017 | Buccella |
| 10,201,068 B2 | 2/2019 | Laurisch et al. |
| 2005/0035093 A1 | 2/2005 | Yamaguchi et al. |
| 2011/0210100 A1 | 9/2011 | Smallwood et al. |
| 2011/0290767 A1 | 12/2011 | Muscat-Tyler et al. |
| 2012/0298633 A1 | 11/2012 | Riemann et al. |
| 2015/0273618 A1 | 10/2015 | Harkare et al. |
| 2015/0352666 A1 | 12/2015 | Fujita et al. |
| 2016/0129515 A1 | 5/2016 | Phillip et al. |
| 2017/0095878 A1 | 4/2017 | Liebold et al. |
| 2018/0236588 A1 | 8/2018 | Namburu et al. |

FOREIGN PATENT DOCUMENTS

| | | |
|---|---|---|
| JP | H04351269 A | 12/1992 |
| WO | 2015053162 A1 | 4/2015 |
| WO | 2018207710 A1 | 11/2018 |

OTHER PUBLICATIONS

Notification of Transmittal of International Search Report & Written Opinion including International Search Report and Written Opinion for International Application No. PCT /US2020/065041 dated Oct. 26, 2021, 19 pages.

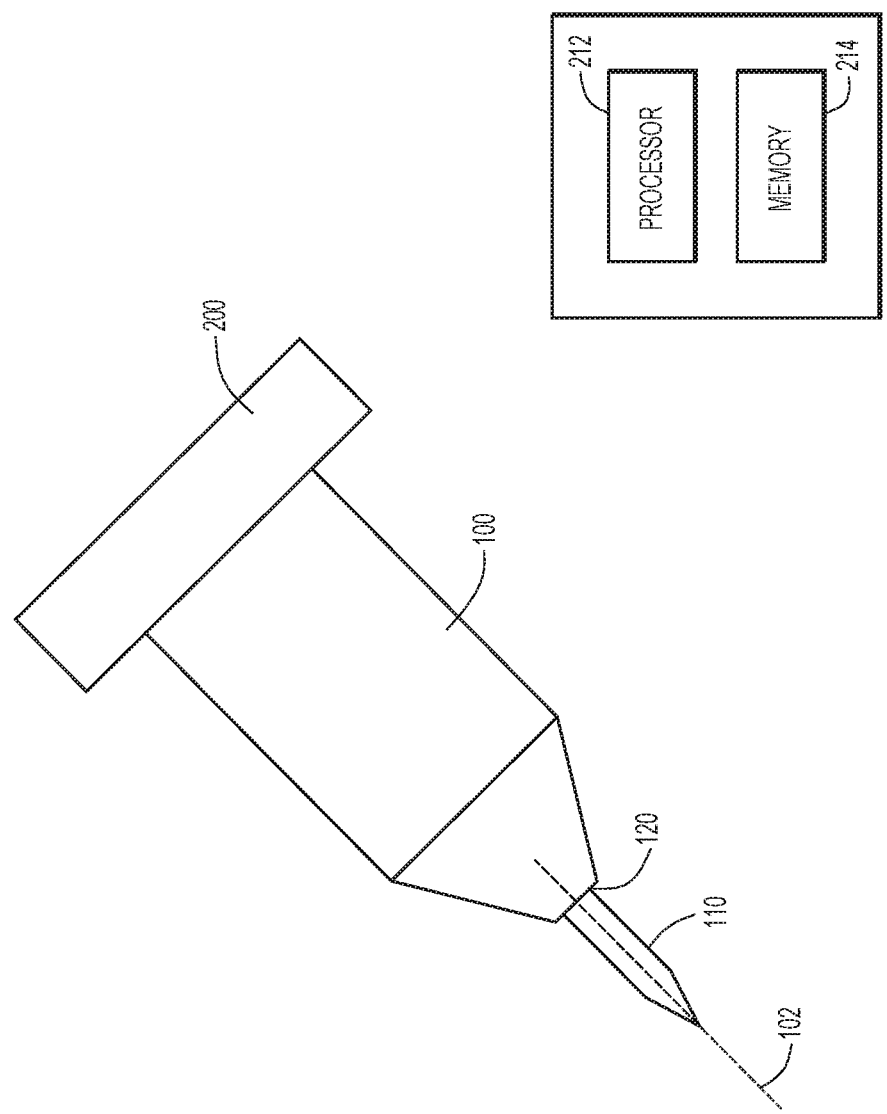

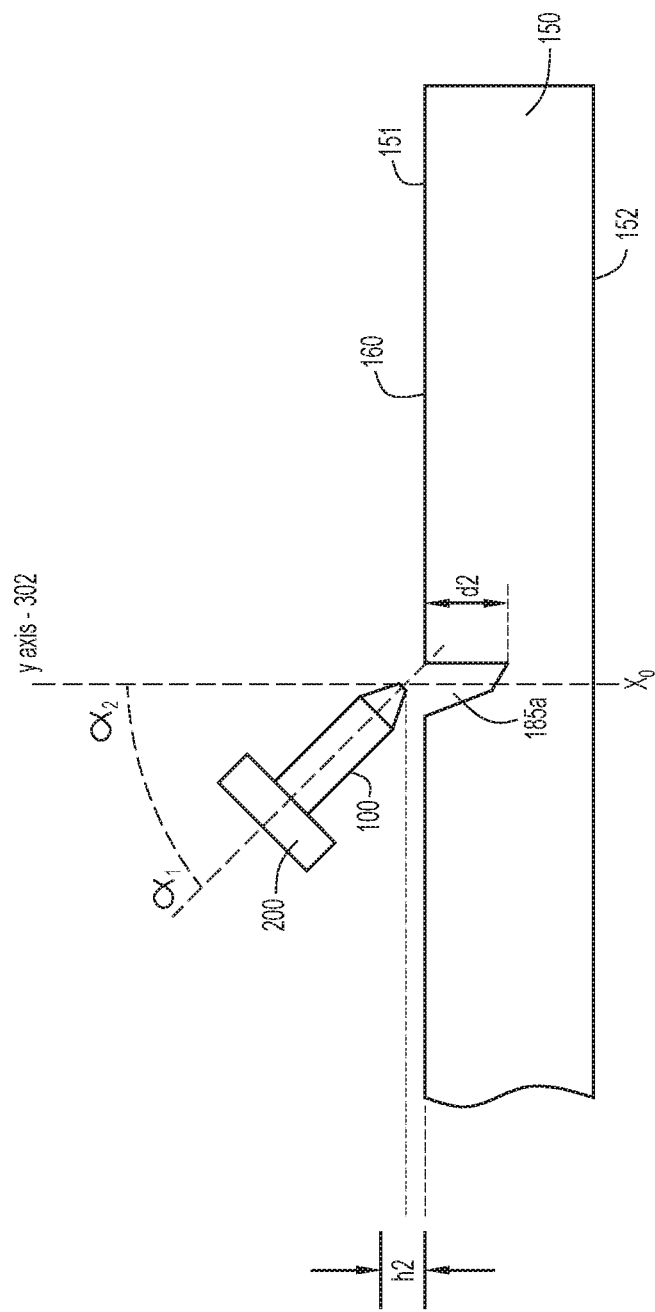

METHODS AND APPARATUS FOR FORMING A PIERCE HOLE IN A WORKPIECE

TECHNICAL FIELD

The present disclosure relates to plasma cutting systems, and more particularly to methods and apparatus for forming a pierce hole in a workpiece by use of a plasma torch.

BACKGROUND

Generally, a plasma torch can begin the cutting process in two manners. The first is to begin cutting at an edge of a workpiece, where the arc can begin cutting through the entire thickness of a workpiece at once. The second manner is to pierce through a workpiece to begin cutting at a non-edge location. Piercing forces an arc through a workpiece's thickness, displacing material upwards towards the torch tip as the pierce hole deepens. Unfortunately, this displaced material, which is molten metal, can redeposit on the tip causing cut quality issues and/or damage to the tip. Additionally or alternatively, the displaced material (the molten metal) can accumulate in a large puddle around the pierce hole. If the displaced material accumulates, it has to be removed carefully so as not to damage the plasma consumables (e.g., the tip) or negatively impact the cut quality. At least these two issues often limit the thickness of material that can be successfully pierced at a given power output. Thus, users often start cutting at an edge of a workpiece, even if doing so will generate more material waste than starting with a pierce.

Another problem is that a large portion of the displaced molten metal produced during the piercing process accumulates and solidifies to form dross in an area located between the pierce hole and the intended final work product. As a result, the lead-in from the pierce hole to the intended work product is required to be longer as a result of having to maneuver the torch around any accumulated dross.

SUMMARY

Methods disclosed and contemplated herein resolve the aforementioned issues by piercing while moving a torch tip in a specific pattern in order to control and direct the displacement of material from the pierce hole. According to one implementation, the distal end of the plasma torch tip is positioned a first height above a top surface of a workpiece and is arranged such that the cutting axis of the plasma torch tip is orthogonal or non-orthogonal to the top surface of the workpiece. The plasma torch is then energized so that a plasma arc emitted by the torch attaches to the workpiece. The tip of the plasma torch is then moved in a manner that causes the molten metal to be swept out of the cut ahead of the tip predominately in a direction away from the intended work product. In the context of the present application, the tip of the plasma arc is that part of the arc that impinges on the workpiece.

According to one implementation, after the plasma torch is energized, the cutting axis of the plasma torch tip is caused to move from its initial angular position to a different angular position with or without translating the plasma torch along a length or width of the workpiece. According to one implementation, the molten metal located in the cut is swept out of the cut by only a rotation of the plasma torch. According to some implementations, the height of the plasma torch tip may be varied during the rotation of the plasma torch or between torch rotations. According to some implementations the rate at which the torch is rotated between its different angular positions is also varied.

According to some implementations, the pierce hole is achieved through a single rotation of the plasma torch between its initial angular position and a final angular position. According to other implementations the process of creating the pierce hole is achieved by multiple rotations of the plasma torch with the pierce depth being increased with each successive sweep of the torch tip. According to some implementations wherein the pierce hole is achieved by multiple rotations of the torch, the height of the plasma torch tip changes with each rotation so that as the depth of the pierce increases the height of the plasma torch tip above the workpiece decreases. According to some implementations the rate at which the torch is rotated between its initial and final angular positions varies between two or more of the rotations. For example, according to one implementation as the depth of the pierce increases so does the rate of rotation of the torch. According to such an implementation, the rotation time between initial and final angular positions of the torch progressively decreases between successive rotations.

According to other implementations, the cutting axis of the torch tip can be moved in a diametrically decreasing manner, beginning from a larger diameter and spiraling to a smaller diameter, to create a pierce hole while controlling displacement of material out of the pierce hole. In one example, the cutting axis of the torch tip remains normal to a workpiece as the cutting axis is moved in a spiral pattern. In another example, the cutting axis of the torch tip is maintained non-orthogonal to the workpiece to create a spiral pattern. Either way, the spiral pattern creates a tapered hole (e.g. a funnel-shaped hole) that allows molten material which is displaced laterally by the plasma arc, to expand outwards around the tip without moving directly onto the tip or at least reducing the amount of molten material that moves onto the tip.

These and other advantages and features will become evident in view of the drawings and detailed description.

BRIEF DESCRIPTION OF THE DRAWINGS

FIG. 2 is a side view of a generic plasma torch tip shown emitting a plasma arc that is concentrically aligned with the cutting axis of the plasma torch tip.

FIG. 5B shows the plasma torch tip of FIG. 5A having been rotated to form an initial pierce in the top surface of the workpiece.

DETAILED DESCRIPTION

Figure 1A:
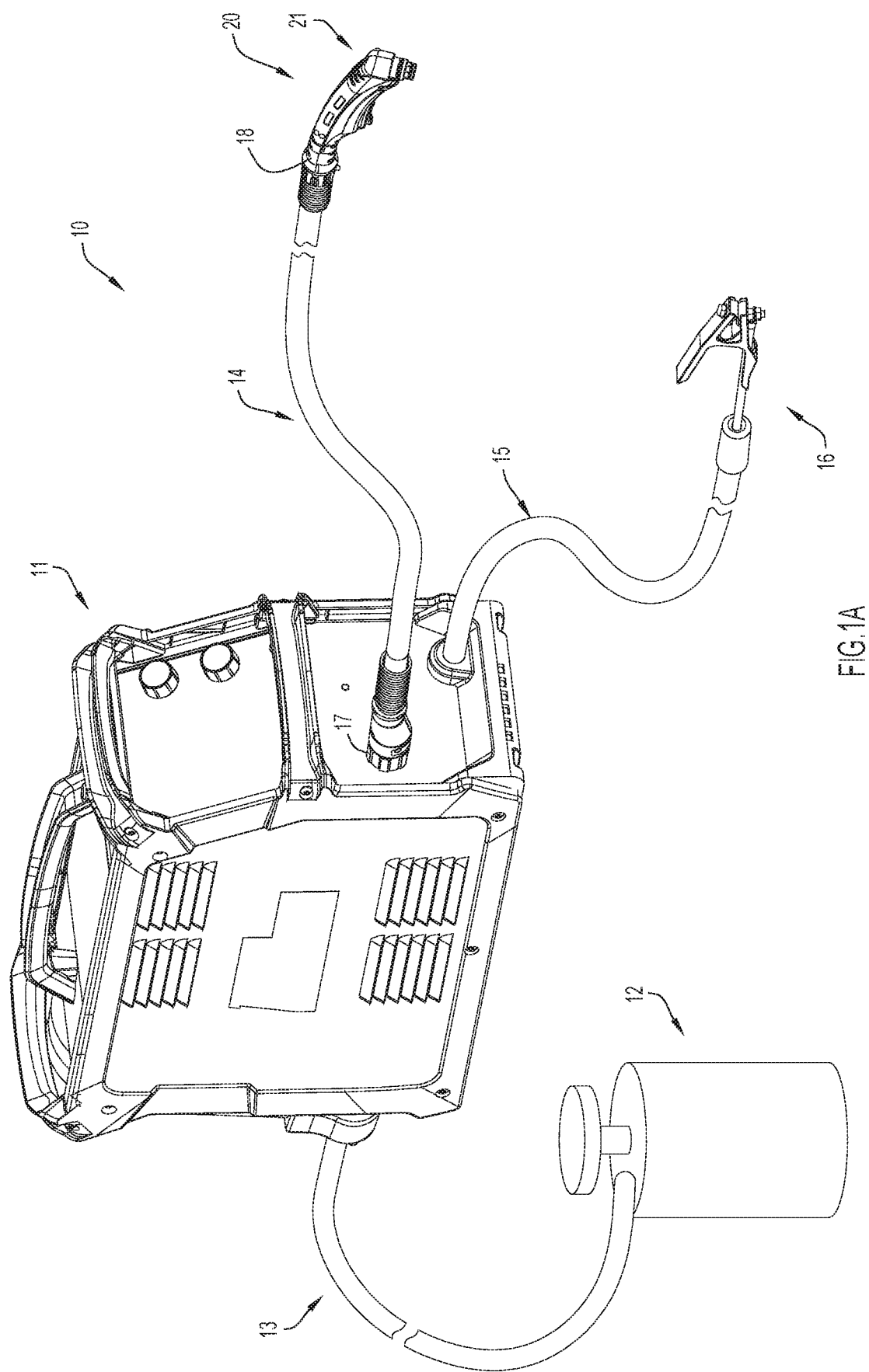
FIG. 1A is a perspective view of a cutting system according to one implementation.

Various implementations of forming a pierce hole in a workpiece by use of a plasma torch are disclosed herein. FIG. 1A illustrates an example cutting system 10. The depicted cutting system 10 includes a power supply 11 that supplies power to a torch assembly 20. The power supply 11 also controls the flow of a process gas from a process gas supply 12 to the torch assembly 20 (however, in other implementations, the power supply 11 might supply the process gas itself). The process gas supply 12 is connected to the power supply via cable hose 13 and the power supply 11 is connected to the torch 21 included in the torch assembly 20 via cable hose 14. The cutting system 10 also includes a working lead 15 with a grounding clamp 16 disposed at an end thereof.

Cable hose 13, cable hose 14, and/or working lead 15 may each include various conductors so that they may transmit data, electricity, signals, etc. between components of the cutting system 10 (e.g., between the power supply 11 and the torch 21 of the torch assembly 20) and, as is illustrated, cable hose 13, cable hose 14, and/or working lead 15 may each be any length. In order to connect the aforementioned components of the cutting system 10, the opposing ends of cable hose 13, cable hose 14, and/or working lead 15 may each be coupled to the gas supply 12, power supply 11, torch 21, or clamp 16 in any manner now known or developed hereafter (e.g., a releasable connection). The cable hose 14 may include a first connector 17 that releasably couples a first end of the cable hose 14 to a port of the power supply 11 and may also include a second connector 18 that releasably couples a second end of the cable hose 14 to the torch 21. Thus, the torch 21 may be releasably coupled to the power supply 11 via a releasable connection formed between the cable hose 14 and the power supply 11 and/or via a releasable connection formed between the cable hose 14 and the torch 21.

Figure 1B:
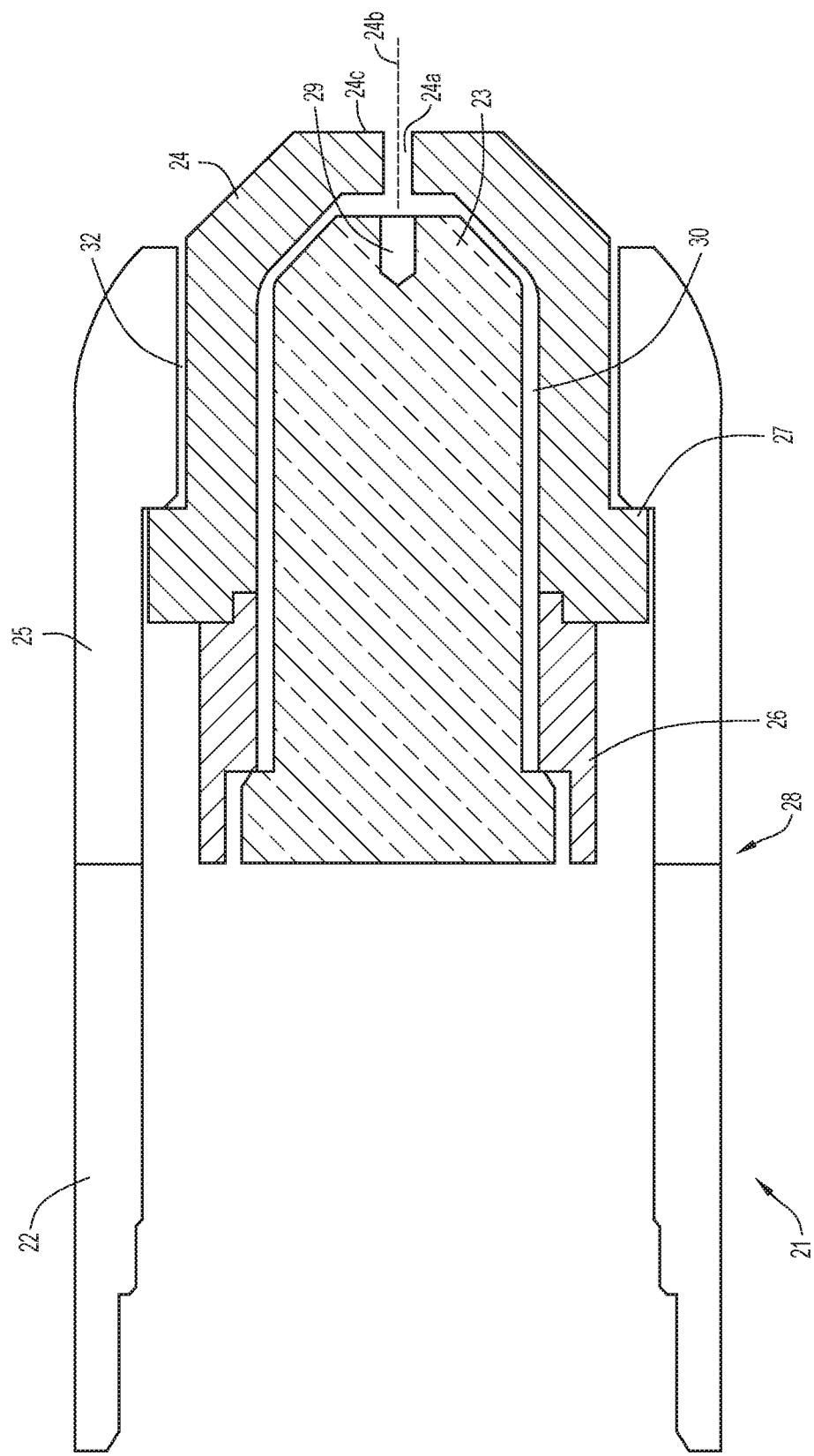
FIG. 1B is a cross-section side view of an end section of a plasma torch according to one implementation.

FIG. 1B illustrates a portion of the torch 21 according to one implementation. For simplicity, FIG. 1B illustrates a distal end portion of the plasma torch without various components or parts, such as power or gas transfer components, that are typically included in a plasma cutting torch. Instead, FIG. 1B only illustrates select components or parts that allow for a clear and concise illustration of the techniques presented herein. In the depicted implementation, the torch body 22 includes a number of consumable parts, such as, for example, an electrode 23, a nozzle 24, a shield cup 25 and gas distributor 26. A distal-most end of the nozzle 24 includes an orifice 24a having a longitudinally extending central axis 24b. Located in a distal end portion of the electrode 23 is an emitter 29. The gas distributor 26 and the electrode 23 can be installed into the torch body 22 and the nozzle 24 can be installed there over. Alternatively, the gas distributor 26, the electrode 23, and the nozzle 24 can be installed onto the torch body as a single component (e.g., these components may be coupled to each other to form a cartridge and installed on/in the torch body 22 as a cartridge).

Once the electrode 23 and nozzle 24 are installed onto/into the torch body 22, the shield cup 25 is installed around an installation flange 27 of the nozzle 24 in order to secure the nozzle 24 and electrode 23 in place at (and in axial alignment with) an operating end 28 of the torch body 102. Additionally or alternatively, the nozzle 24 and/or electrode 23 can be secured or affixed to the torch body 22 in any desirable manner, such as by mating threaded sections included on the torch body 22 with corresponding threads included on the components. For example, in some implementations, the electrode 23, nozzle 24, shield cup 25, gas distributor 26, as well as any other components (e.g., a lock ring, spacer, secondary cap, etc.) may be assembled together in a cartridge that may can be selectively coupled to the torch body 22. For example, the various components may be coupled to a cartridge body or coupled to each other to form a cartridge.

In use, the plasma torch 20 is configured to emit a plasma arc between the electrode 23 and a workpiece to which the grounding clamp 16 is attached. As shown in FIG. 1B, the torch tip 24 is spaced a distance away from the electrode 23 with there being a process gas flow channel 30 disposed between them. During initiation, power is first supplied to the nozzle 24 (anode) to generate an arc between the nozzle 24 and the electrode 23 (cathode) across the process gas flow channel 30. As process gas flows through channel 30 during arc initiation it is ionized to form an electrically conductive plasma that is then directed out the orifice 24a of the nozzle 24 towards an electrically conductive workpiece (e.g. metal workpiece). Once this occurs, power (typically DC power) is supplied to the electrode 23 and an electrical circuit is established between the power source and a ground to which the workpiece is coupled via the grounding clamp 16. A plasma arc that closes the electrical circuit is thus established between the electrode 23 and the workpiece, the plasma arc being sufficient to cut through the workpiece by a localized melting of the material from which the workpiece is made. When power is supplied to the electrode 23, power to the nozzle 24 is terminated.

According to some implementations, when the plasma torch is equipped with the shield cap 25, a pressurized shield gas channel 32 is provided between the shield cap 25 and the outside of the nozzle 24 and is used to provide shielding gas at the cutting area of the workpiece to protect the cutting area from contaminates.

In the foregoing discussion the torch 21 is represented as a hand-held device that is maneuvered by a hand of a user of the torch. However, according to other implementations, a modified version of the torch 21 is secured to a multi-axis torch holder 200 as shown in FIGS. 4A-5C.

FIG. 2 illustrates an external generic side view of a plasma torch 100 that internally includes at least an electrode and a nozzle, and optionally includes one or more of the other components discussed above in conjunction with FIG. 1B. It is appreciated that the plasma torch 100 may include components other than or in addition to those shown in FIG. 1B. The torch 100 has a cutting axis 102 that corresponds to the longitudinally extending central axis 24b of the orifice 24a depicted in FIG. 1B. That is, the cutting axis 102 corresponds to a central axis of an aperture through which the plasma gas exits the nozzle. For sake of simplicity in illustrating the methods provided herein, the generic torch 100 is shown producing a plasma arc 110 that is concentrically aligned with the cutting axis 102 of the torch tip 120 located at the distal end of the torch where the plasma arc exits the nozzle. According to some implementations, the torch 100 is coupled to a carriage 200 of a multi-axis positioning system that mechanically controls the translating and rotating of the carriage through the use of motorized transport mechanisms and motorized rotation mechanisms that are under the control of a controller 210 that includes a processor 212 that executes software instructions stored in one or more memory devices 214.

Figure 3A:
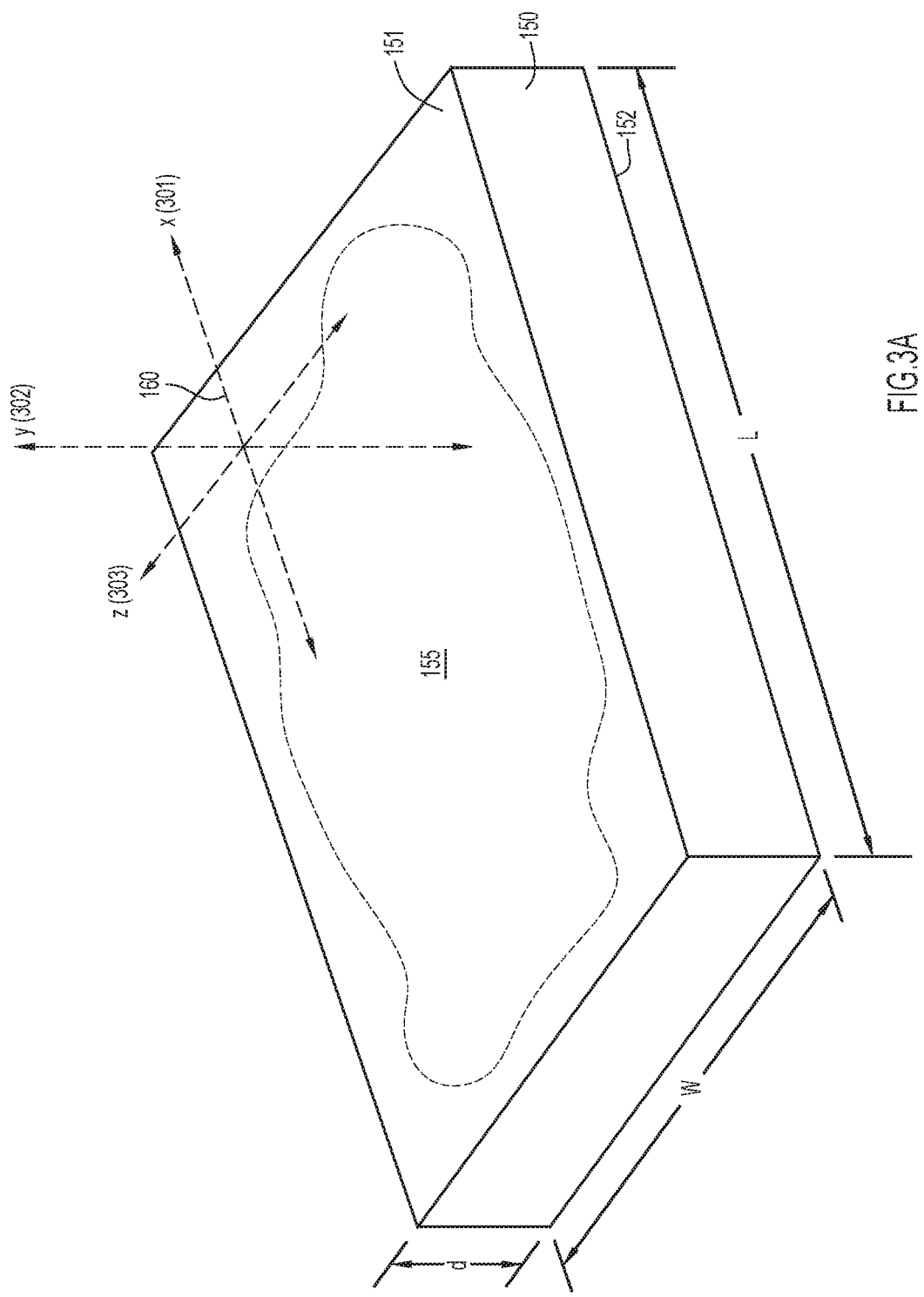
FIG. 3A shows a workpiece in three-dimension space defined by an x, y, z coordinate system.

FIG. 3A shows a workpiece 150 in three-dimensional space defined by an x, y, z coordinate system. The x, y, z coordinate system includes an x-axis 301, a y-axis 302 and a z-axis 303. In the example of FIG. 3A, the length "L", width "W" and the thickness "T" of the workpiece 150 respectively extend in a direction of the x-axis 301, y-axis 302 and z-axis 303. For discussion purposes, the initial pierce location 170, when creating the pierce hole, is located at the intersection of the x, y and z axes. As will be discussed in more detail below, the torch 100 is attached to a carriage 200 under the control of a multi-axis positioning system that controls the translation and rotation of the torch carriage 200. As noted above, the multi-axis positioning system includes a processer 212 (e.g. microprocessor) and one or more memory devices 214 that store a variety of data and software instructions for execution by the processor 212. The one or more memory devices 214 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 214 may comprise one or more tangible (non-transitory) computer readable storage media (e.g., a memory device) encoded with software (e.g., control logic/software comprising computer executable instructions and, when the software is executed by the processor 212, it is operable to perform the operations described herein. That is, the processor 212 is configured to execute instructions stored in the one or more memory devices 214 to cause the torch carriage 200 to translate and/or rotate with respect to the workpiece during the formation of a pierce hole 190 and the subsequent cutting of the final work product 155 along cutting path 154. Element 160 in the figures denotes an area of the workpiece outside the perimeter of the final work product that is typically scrapped at the completion of the cutting process.

Figure 4A:
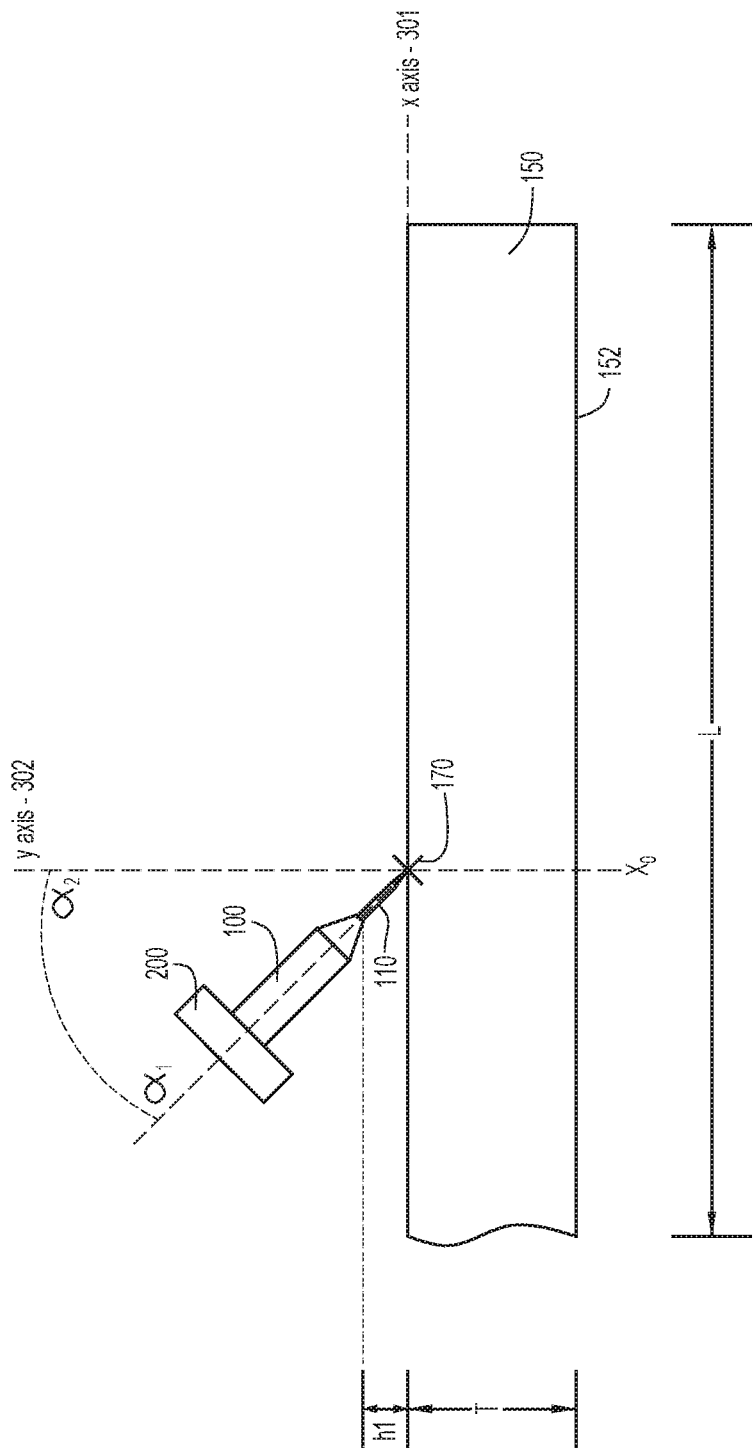
FIG. 4A shows an initiation of forming a pierce hole in the workpiece of FIG. 3A with the cutting axis of the plasma torch tip arranged non-orthogonal to the top surface of the workpiece.

FIG. 4A illustrates the plasma torch tip 100 assembled on the carriage 200 that is used to translate the torch 100 with respect to the workpiece 150 in two-dimensional space defined by the x-axis 301 and the y-axis 302, or in three-dimension space defined by the x-axis 301, y-axis 302 and z-axis 303. The carriage 200 is further configured to alter the angular orientation of the cutting axis 102 of the torch tip with respect to the y-axis. That is, the torch carriage 200 may rotate the torch 100 in any direction (such as the R direction) to orient the cutting axis 102 to be parallel to the y-axis or non-parallel to the y-axis. Endowed with these movement capabilities, a pierce hole 190 may be formed in the workpiece 150 by first positioning the torch tip 120 a first height h1 (in the y-axis direction) above an original location Xo of the workpiece with the cutting axis 102 of the torch 100 oriented non-orthogonal to the top surface 151 of the workpiece (i.e. non-parallel to the y-axis 302). The plasma torch 100 is then energized by suppling a cut current and a process gas flow to the torch to create a plasma arc 110 that attaches to the workpiece 150 at the Xo location. Upon the plasma arc 110 attaching to the work piece 150, metal at the top surface 151 of the workpiece is melted while at the same time the pressurized ionized process gas, and optionally also a pressurized shield gas, is caused to propel the molten metal away from the torch tip 120 and out of the formed cut toward area 160.

Figure 3B:
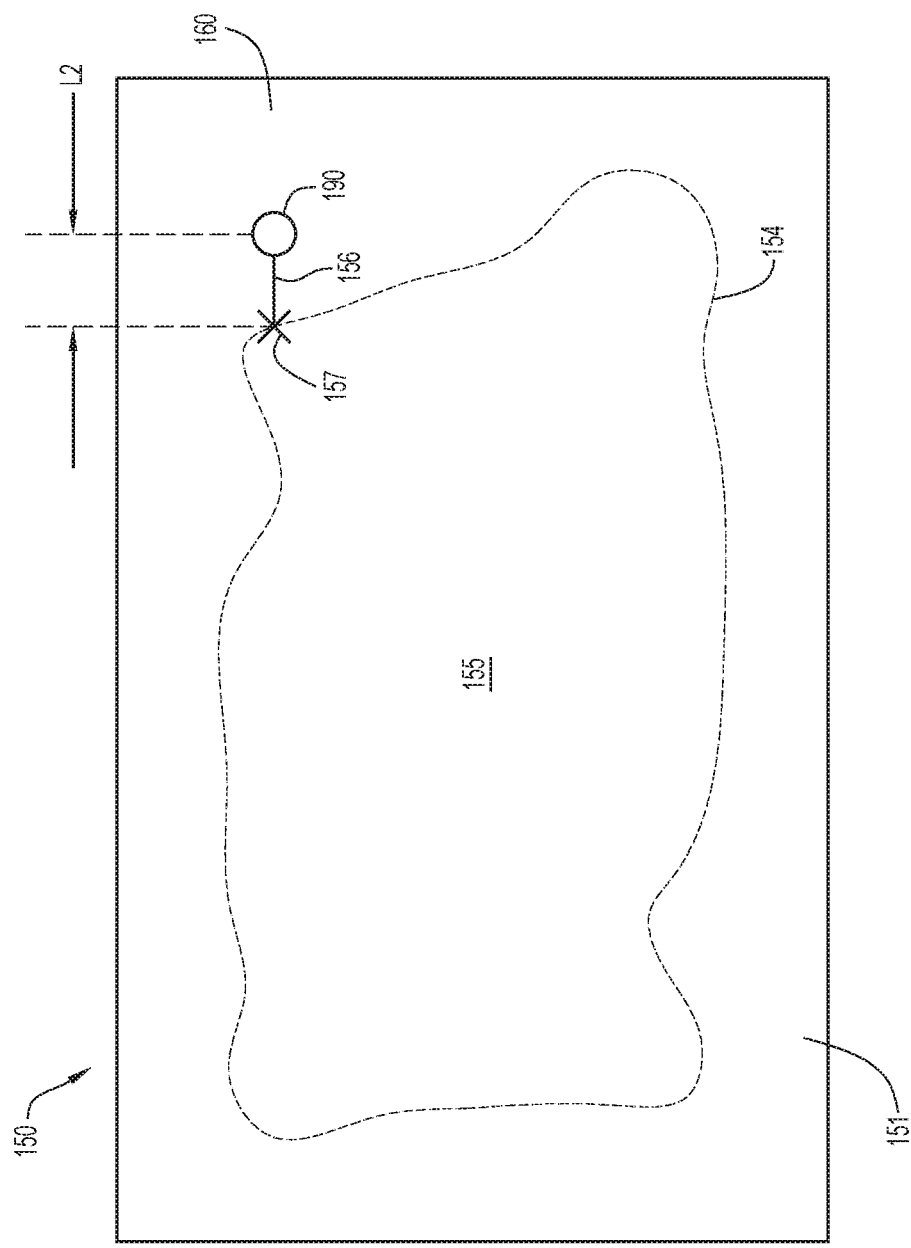
FIG. 3B shows a top view of the workpiece of FIG. 3A showing a pierce hole formed in the workpiece and a lead-in cut extending from the pierce hole to the origin of a final work product cutting path.
Figure 4B:
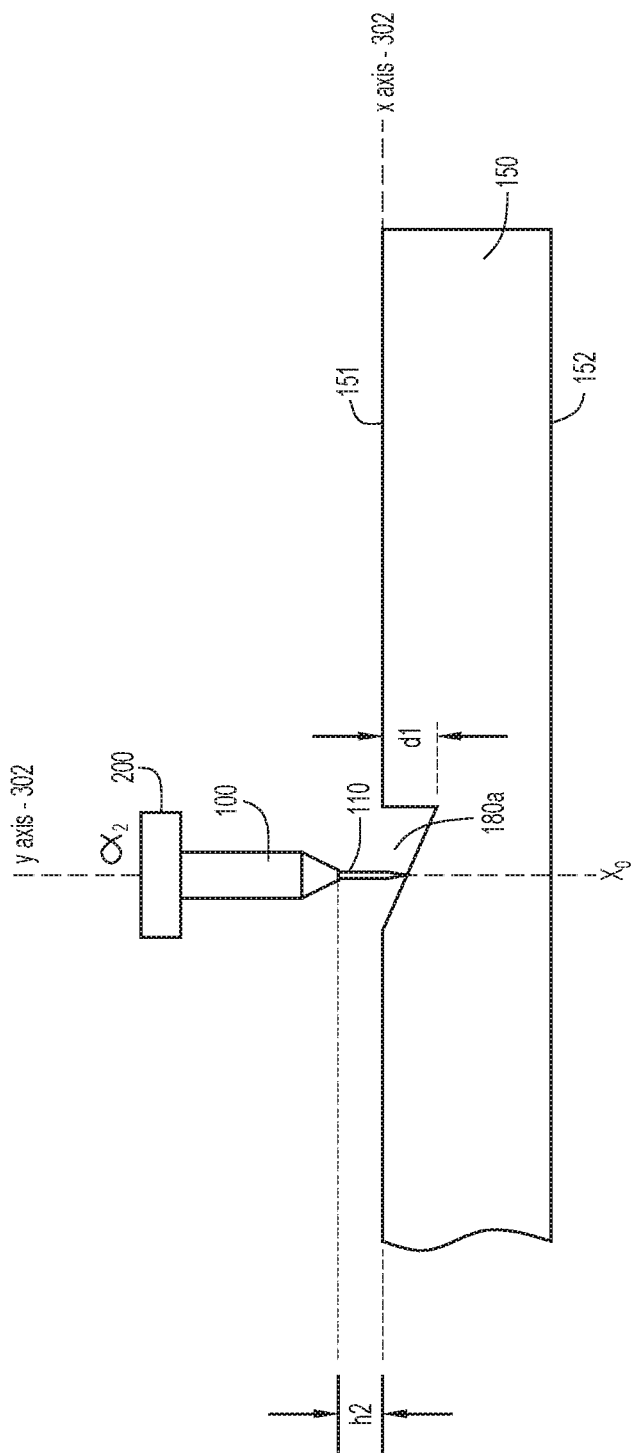
FIG. 4B shows the plasma torch tip of FIG. 4A having been rotated to form an initial pierce in the top surface of the workpiece.

After the initiation of the cutting of the workpiece 150, and while the plasma torch remains energized, the cutting axis 102 of the plasma torch 100 is rotated from its original angular position $\alpha_1$ (with respect to the y-axis 302) to a final angular position $\alpha_2$. According to some implementations the initial angle $\alpha_1$ is between 30 to 70 degrees (as measured from the y-axis), and preferably between 40 to 50 degrees (as measured from the y-axis). As shown in FIG. 4B, according to one implementation the final angular position $\alpha_2$ of the cutting axis 102 is 0 degrees with the cutting axis 102 being parallel with the y-axis 302. In instances where the top surface 151 of the workpiece is planar (as shown in the figures), when the final angular position $\alpha_2$ is 0 degrees, the cutting axis 102 of the plasma torch is orthogonal to the top surface 151. The placement of the plasma torch and the manner in which it is rotated during the pierce hole forming process advantageously causes a majority of the melted metal created by the plasma arc to be deposited in the form of dross in area 160 of the workpiece, away from the intended final product 155. As a result, the length L2 of the lead-in 156 between the pierce hole 190 and the origin of the cutting path 154, as shown in FIG. 3B, can be minimized for lack of having to maneuver the torch across or around a large solidified dross region. This is achieved by causing the torch tip to face in a direction away from the intended work product 155 during the pierce hole cutting process. This beneficially results in less scrap material being produced.

As shown in FIG. 4B, after a first rotation of the cutting axis 102 of the torch between the $\alpha_1$ and $\alpha_2$ angular positions, a pierce 180a having a maximum first depth d1 is produced. In the example of FIGS. 4A and 4B, the torch 100 is not translated as the angular orientation of the torch cutting axis 102 changes. According to other implementations, the torch 100 is translated away from its original position during or after the first rotation.

In the example of FIGS. 4A and 4B, the height h2 of the torch tip 120 above the top surface 151 of the workpiece remains the same during the formation of the initial pierce 180a. However, according to other implementations, the height h2 of the torch tip 120 is decreased during the cutting process as the cutting axis 102 of the torch is rotated between the $\alpha_1$ and $\alpha_2$ angular positions.

Figure 4C:
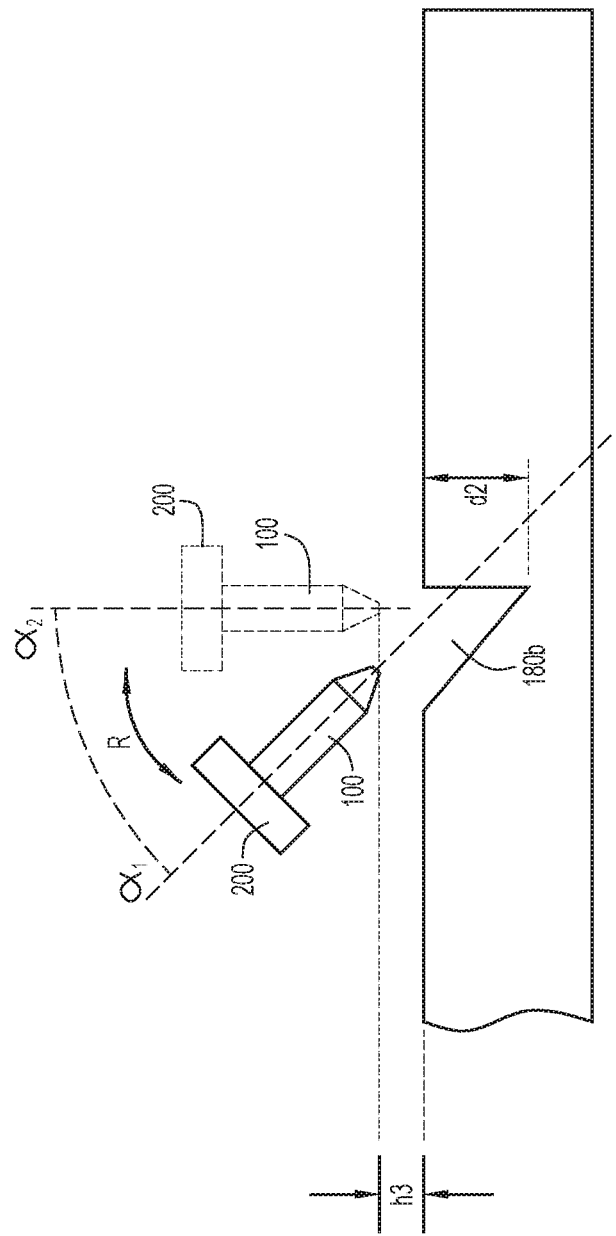
FIG. 4C shows a sweeping action of the plasma torch that is used to progressively increase the depth of the pierce.

As shown in FIG. 4C, after the formation of the initial pierce 180a, the cutting axis 102 of the torch 100 is additionally rotated between the $\alpha_1$ and $\alpha_2$ positions to further deepen the pierce 180b to a maximum depth d2 that is greater than depth d1. This process is repeated until the plasma arc 110 pierces through the bottom surface 152 of the workpiece to produce the pierce hole 190. According to some implementations, the height h3 of the torch tip 120 remains the same throughout the additional rotations of the torch 100, and may be the same as one or both of heights h1 and h2. According to other implementations, however, the height of the torch tip 120 decreases between successive rotations of the cutting axis 102 of the torch 100 between the $\alpha_1$ and $\alpha_2$ angular positions, such that as the depth of the pierce increases the height of the torch tip 120 decreases. The rate at which the cutting axis of the torch is rotated may also be increased between successive rotations of the cutting axis 102 of the torch 100. That is, as the pierce deepens, the torch carriage 200 under the control of controller 210 causes the rate at which the cutting axis 102 of the torch 100 is rotated between the $\alpha_1$ and $\alpha_2$ angular positions to increase.

In the foregoing examples associated with FIGS. 4A-4C, the range of angular rotation of the cutting axis 102 of the torch 100 remains the same during each successive rotation of the torch. However, according to other implementations, the range of angular rotation of the cutting axis 102 changes as the depth of the pierce increases. For example, according to some implementations the range of angular rotation decreases as the depth of the pierce increases.

Methods involving the aforestated features advantageously allow the pierce hole 190 to be more precisely sized and shaped to meet the requirements of different cutting processes and to cause the dross produced during the pierce hole cutting process to be moved in a direction away from the intended work product 155. In addition, by increasing the rate at which the torch is rotated between successive rotations of the cutting axis of the torch and/or by decreasing the height of the torch tip between successive rotations, the time required to produce the pierce hole 190 can also be reduced.

Figure 5A:
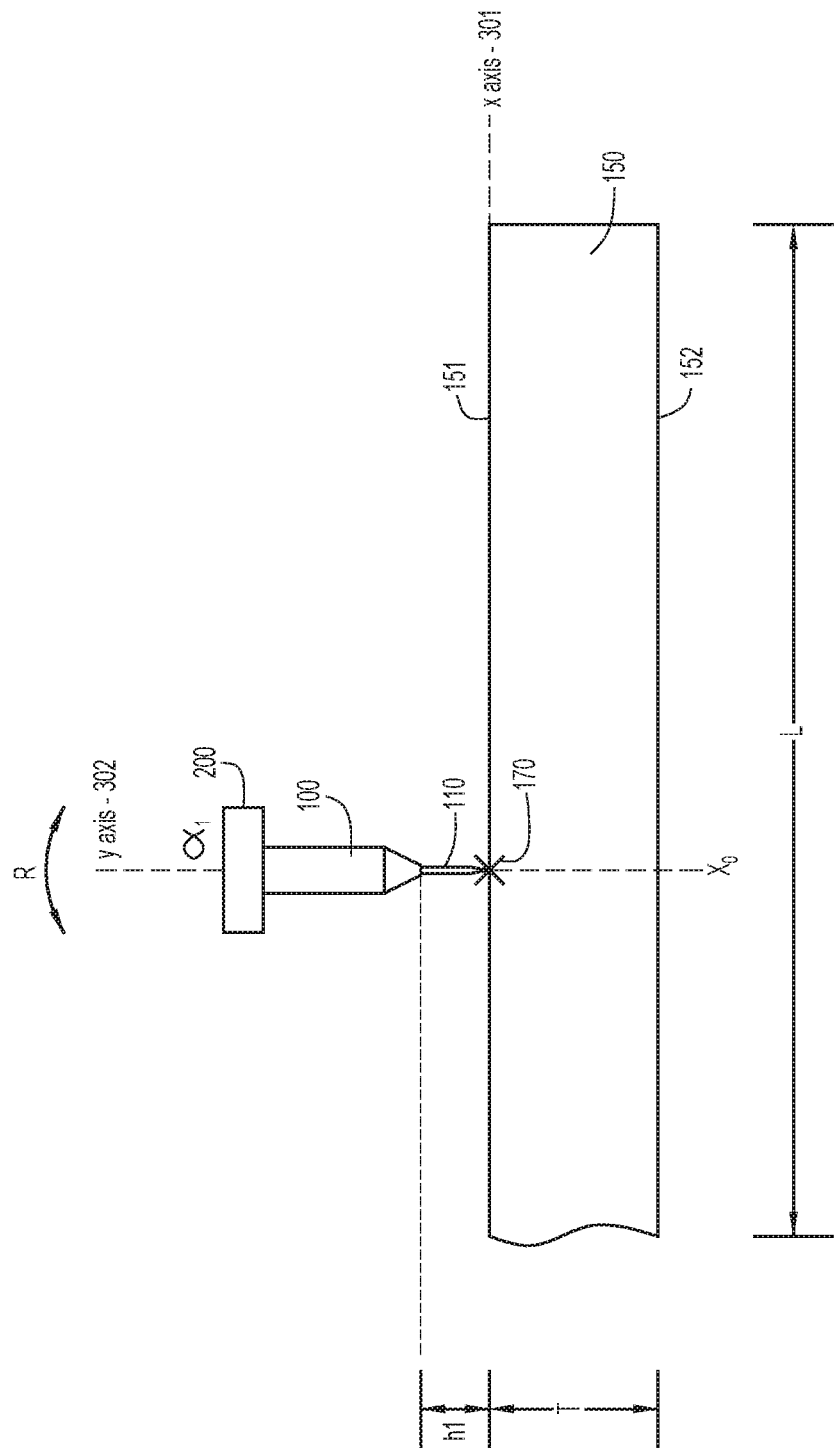
FIG. 5A shows an initiation of forming a pierce hole in the workpiece of FIG. 3A with the cutting axis of the plasma torch tip arranged orthogonal to the top surface of the work piece.
Figure 5C:
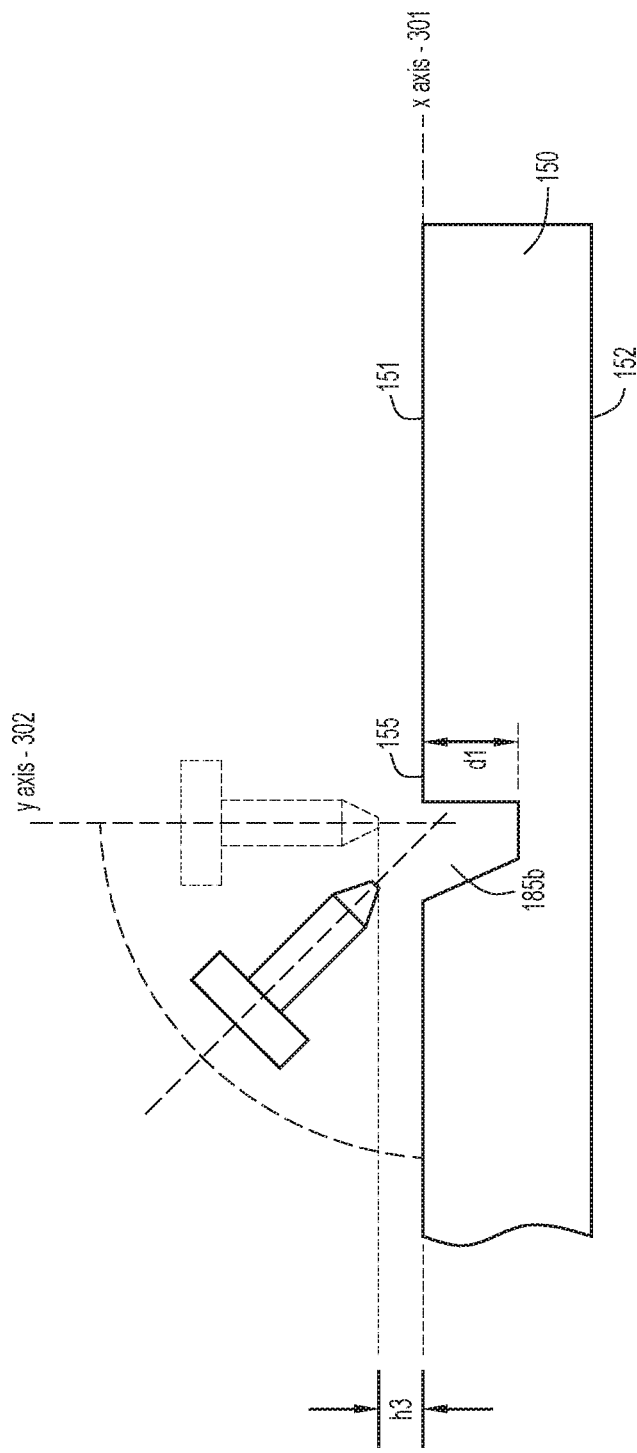
FIG. 5C shows a sweeping action of the plasma torch that is used to progressively increase the depth of the pierce.

FIGS. 5A-C illustrate another method for forming the pierce hole 190, wherein in the initial angular starting position $\alpha_1$ of the cutting axis 102 is arranged parallel or substantially parallel (within ±5 degrees) to the y-axis 302. That is $\alpha_1$=0±5 degrees.

FIG. 5A illustrates the plasma torch tip 100 assembled on the torch carriage 200 that is used to translate the torch tip 100 with respect to the workpiece 150 in two-dimensional space defined by the x-axis 301 and the y-axis 302, or in three-dimension space defined by the x-axis 301, y-axis 302 and z-axis 303. The carriage 200 is further configured to alter the angular orientation of the cutting axis 102 of the torch tip 100 with respect to the y-axis. That is, the torch holder 200 may rotate the torch tip 100 in any direction to orient the cutting axis 102 to be parallel to the y-axis or non-parallel to the y-axis. Endowed with these movement capabilities, the pierce hole 190 may be formed in the workpiece 150 by first positioning the torch tip 100 a first height h1 (in the y-axis direction) above an initial location Xo of the workpiece with the cutting axis 102 of the tip 100 oriented orthogonal or substantially orthogonal to the top surface 151 of the workpiece (i.e. parallel or substantially parallel to the y-axis 302). The plasma torch is then energized by suppling a cut current and a process gas flow to the torch to create a plasma arc 110 that attaches to the workpiece 150 at the Xo location. Upon the plasma arc 110 attaching to the work piece 150, metal at the top surface 151 of the workpiece is melted while at the same time the pressurized ionized process gas, and optionally also a pressurized shield gas, is caused to propel the molten metal away from the torch tip 120 and out of the formed cut toward area 160.

After the initiation of the cutting of the workpiece 150, and while the plasma torch remains energized, the cutting axis 102 of the plasma torch is rotated from its original angular position al (with respect to the y-axis 302) to a final angular position $\alpha_2$ as shown in FIG. 5B. As explained above, according to some implementations the initial angle $\alpha_1$ is between 0±5 degrees. As shown in FIG. 5B, according to some implementations the final angular position $\alpha_2$ of the cutting axis 102 is between 30 to 70 degrees (as measured from the y-axis), and preferably between 40 to 50 degrees (as measured from the y-axis). The placement of the plasma torch and the manner in which it is rotated during the pierce hole forming process advantageously causes a majority of the dross created by the plasma arc to be deposited in area 160 of the workpiece away from the intended final work product 155. This is achieved by causing the torch tip to face in a direction away from the intended work product 155. As a result, the length L2 of the lead-in 156 between the pierce hole 190 and the origin of the cutting path 154, as shown in FIG. 3B, can be minimized for lack of having to maneuver the torch tip 120 across or around a large mass of dross. This beneficially results in less scrap material being produced.

As shown in FIG. 5B, after a first rotation of the cutting axis 102 between the $\alpha_1$ and $\alpha_2$ angular positions, a pierce 185a having a maximum first depth d1 is produced. In the example of FIGS. 5A and 5B, the torch 100 is not translated as the angular orientation of the cutting axis 102 of the torch 100 moves between the $\alpha_1$ and $\alpha_2$ angular positions. According to other implementations, the torch 100 is translated away from its initial position above the workpiece between torch rotations. In the example of FIGS. 5A and 5B, the height h2 of the torch tip above the top surface 151 of the workpiece remains the same during the initial pierce 185a cutting process. However, according to other implementations, the height h2 is decreased during the cutting process as the cutting axis 102 of the torch is rotated between the $\alpha_1$ and $\alpha_2$ angular positions.

As shown in FIG. 5C, after the formation of the initial pierce 185a, the cutting axis 102 of the torch 100 is rotated between the $\alpha_1$ and $\alpha_2$ positions to produce a deepened pierce 185b having a maximum depth d2 that is greater than d1. This rotation of the cutting axis 102 of the torch 100 is repeated until the plasma arc 110 pierces through the bottom surface 152 of the workpiece to produce the pierce hole 190. The height h3 of the torch tip 120 may remain the same or progressively or incrementally decrease between successive rotations of the torch.

With continued reference to the example of FIGS. 5A-C, according to some implementations, between successive rotations of the cutting axis 102 of the torch 100 between the $\alpha_1$ and $\alpha_2$ angular positions, the height of the torch tip 120 with respect to the top surface 151 of the workpiece 150 is decreased and/or the rate at which the cutting axis of the torch is rotated is increased. That is, as the pierce deepens, the carriage 200 that controls the movement of the torch 100 causes the torch tip 120 to be moved nearer the workpiece and/or causes the rate at which the cutting axis 120 of the torch 100 is rotated between the $\alpha_1$ and $\alpha_2$ angular positions to increase.

In the foregoing examples associated with FIGS. 5A-5C, the range of angular rotation of the cutting axis 102 of the torch 100 remains the same during each successive rotation of the torch. However, according to other implementations, the range of angular rotation of the cutting axis 102 changes as the depth of the pierce increases. For example, according to one implementation the range of angular rotation decreases as the depth of the pierce increases.

FIGS. 6A-6D illustrate other methods for forming a pierce hole 460 that extends between a top surface 451 and a bottom surface 452 of a metal workpiece. The method includes positioning the distal end 101 of the plasma torch tip 100 a first height h1 above the top surface 451 of the workpiece at a location spaced a first distance D1 diametrically away from the intended central axis 453 of the pierce hole being formed. According to one implementation, the cutting axis 102 of the plasma torch tip 100 is oriented orthogonal to the top surface 451 of the workpiece 450 and remains that way during the entirety of the pierce hole cutting process like that shown in FIG. 6A. According to other implementations, the angular orientation of the cutting axis 102 of the plasma torch tip is varied during the cutting process. According to yet other implementations, the cutting axis 102 of the plasma torch tip 100 is initially oriented non-orthogonal to the top surface 451 of the workpiece 450 and remains that way in a fixed angular position during the entirety of the cutting process like that shown in FIG. 6C.

Figure 6A:
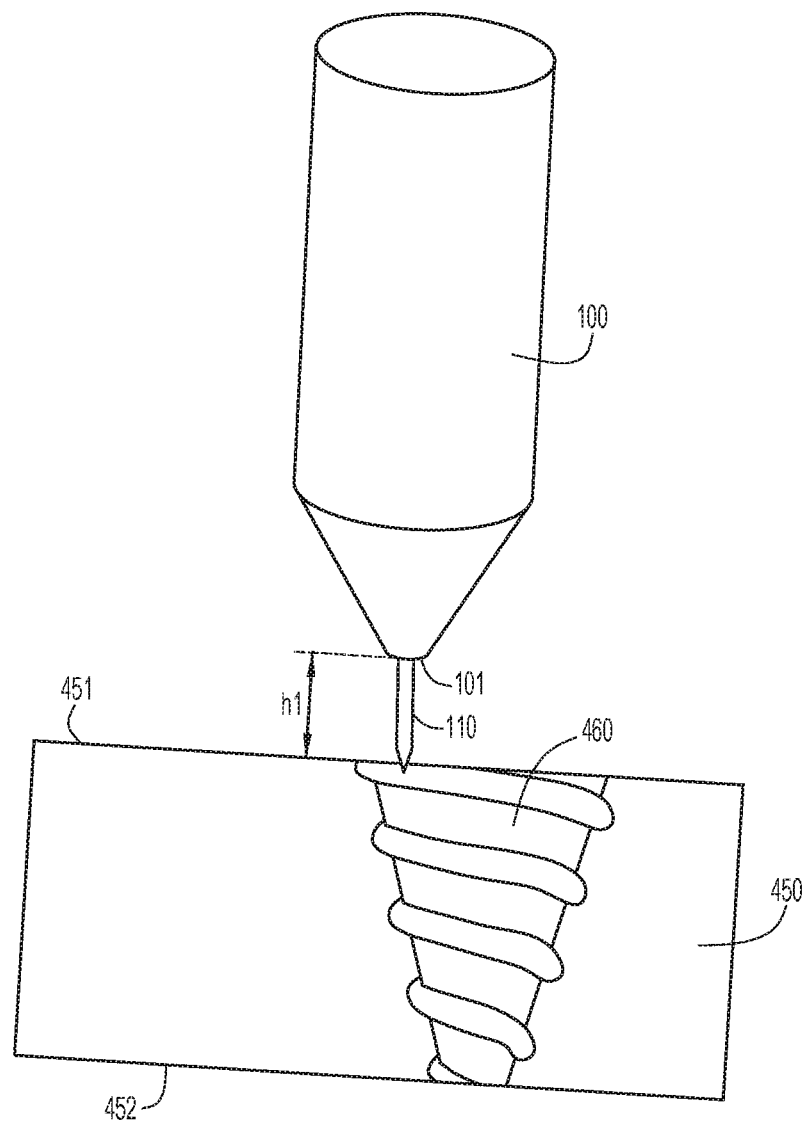
FIG. 6A shows a plasma torch tip with its cutting axis being arranged orthogonal to a top surface of the workpiece and spaced a distance away from a designated central axis of the pierce hole to be produced.
Figure 6B:
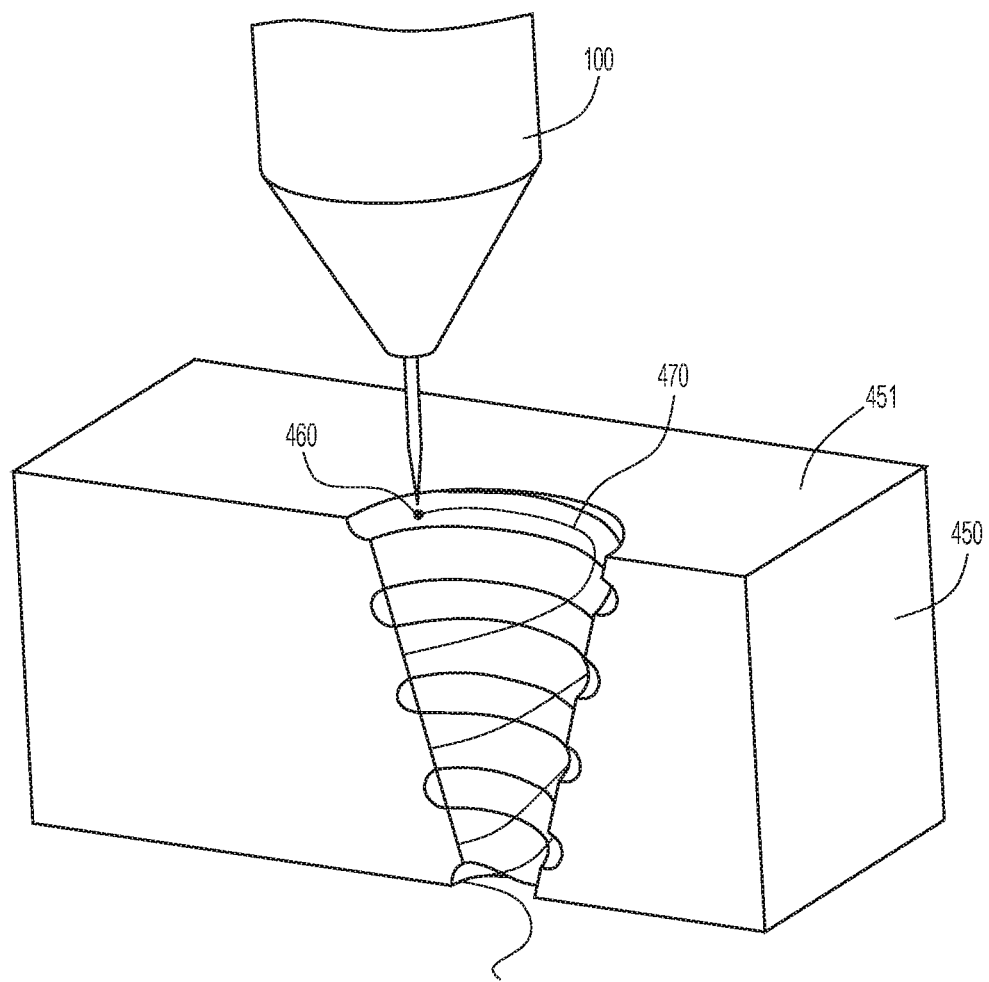
FIG. 6B illustrates a movement of the distal end of the plasma torch tip during the formation of a pierce hole according to one implementation.
Figure 6C:
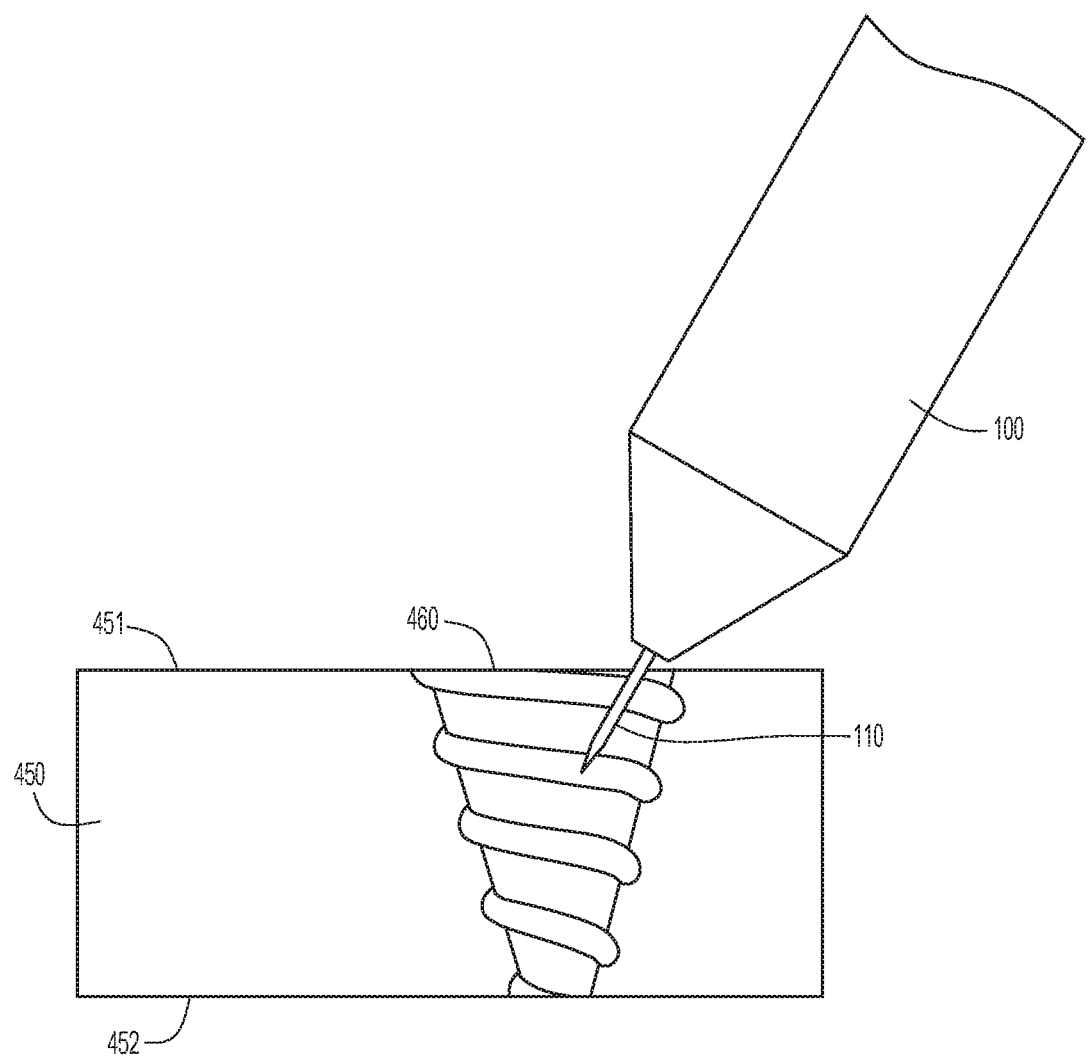
FIG. 6C shows a plasma torch tip with its cutting axis being arranged non-orthogonal to a top surface of the workpiece and spaced a distance away from a designated central axis of the pierce hole to be produced.
Figure 6D:
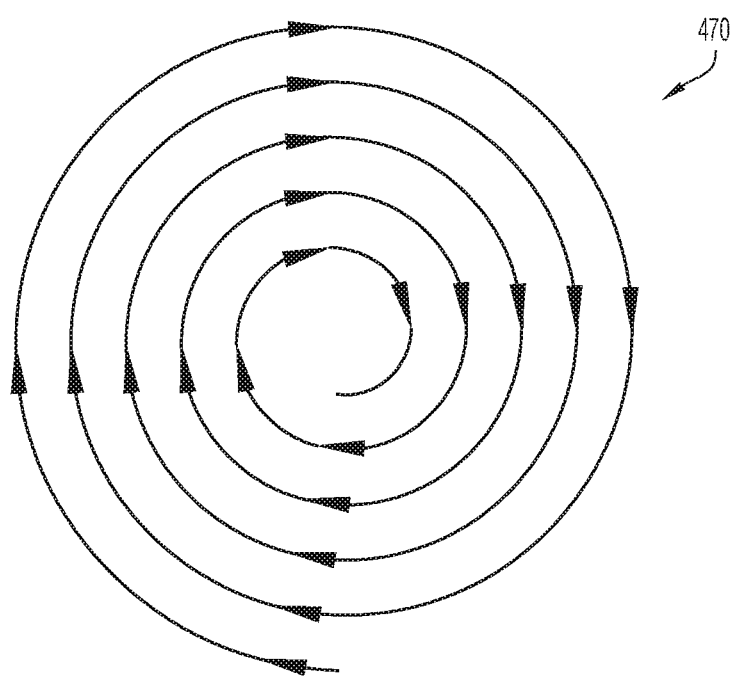
FIG. 6D shows a top view of a spiral pattern by which the plasma torch tip may be rotated to produce the funnel shaped pierce holes illustrated in FIGS. 6A-C.

When the plasma torch tip 100 has assumed its prescribed initial position above the top surface 451 of the workpiece 450 and also its prescribed initial angular orientation, the plasma torch is energized to cause a plasma arc 110 to emit from the plasma torch tip 100. The plasma arc 110 attaches to the workpiece 450 to melt the metal from which the workpiece is made. During the cutting process, the pressurized ionized process gas and/or shield gas exiting the plasma torch tip 100 propels the melted metal away from the plasma torch tip. The plasma torch tip 100 is then rotated around the intended central axis of the pierce hole in a diametrically reducing manner to cause the plasma arc to produce a funnel-shaped pierce hole 460, with a cross-sectional area of the pierce hole at the top surface 451 of the workpiece being greater than a cross-sectional area of the pierce hole at the bottom surface 452 of the workpiece. According to some implementations, the plasma torch tip 100 is caused to rotate about the intended central axis 453 of the pierce hole in a spiraling fashion taking a path 470 like that shown in FIGS. 6B and 6D. FIG. 6D shows a top view a spiral according to one implementation.

The manner in which the plasma torch tip 100 is rotated about the intended central axis of the pierce hole creates a spatial region radially around and above the tip to which the molten metal may be displaced during the cutting operation. This results in a reduced amount of molten metal being directed toward the plasma torch tip 100 during the pierce hole cutting process. By reducing molten metal deposits on the plasma torch tip 100, the useful life of the tip and its consumable parts is advantageously increased.

According to some implementations, the distal end 101 of the plasma torch tip 100 is incrementally or continuously advanced below the initial first height h1 as the plasma torch tip is rotated about the central axis 453 of the pierce hole under construction.

According to any of the implementations disclosed herein, when the plasma torch is energized a current and a process gas at a flow rate are delivered to the plasma torch, and thereafter as a depth of the pierce hole is increased, one or both of the current and the gas flow rate of the process gas to the plasma torch is also increased. According to some implementations, when the plasma torch is energized a shield gas at a flow rate is delivered to the plasma torch tip, and thereafter, as a depth of the pierce hole is increased during the piercing process, the shield gas flow rate delivered to the plasma torch is also increased.

The previous examples are not suggested to limit other variations. The present disclosure is merely exemplary in nature and, thus, variations that do not depart from the spirit of the disclosure are intended to be within the scope of the present disclosure.

What is claimed is:

1. A method of forming a pierce hole in a workpiece made of a metal using a plasma torch coupled to a carriage of a multi-axis positioning system, the multi-axis positioning system including a processor and one or more memory devices that store data and software instructions for execution by the processor, the processor being configured to execute the software instructions to cause the carriage to translate and rotate with respect to the workpiece during formation of the pierce hole in the workpiece, the workpiece having a length and a depth that is a distance between a top surface and a bottom surface of the workpiece, the method comprising:
    translating the carriage to position a tip of the plasma torch at a first position above the top surface of the workpiece and at first height above the top surface of the workpiece;
    rotating the carriage to cause a cutting axis of the plasma torch to assume a first angular position that is non-orthogonal to the top surface of the workpiece;
    energizing the plasma torch to cause a plasma arc to attach to the workpiece to melt the workpiece and to cause a pressurized process gas and/or shield gas exiting the plasma torch tip to propel melted metal away from the plasma torch tip;
    while the plasma torch is energized, causing a first rotation of the carriage to cause the cutting axis of the plasma torch to rotate from the first angular position to a second angular position that is orthogonal or substantially orthogonal to the top surface of the workpiece to create a pierce having a depth; and
    while the plasma torch is energized, increasing the depth of the pierce by causing a second rotation of the carriage to cause the cutting axis of the plasma torch to rotate from the second angular position to the first angular position or to a third angular position different from the first angular position, the third angular position being non-orthogonal to the top surface of the workpiece.

2. The method of forming a pierce hole according to claim 1, further comprising one or more additional rotations of the carriage to cause the cutting axis of the plasma torch to rotate between different angular positions while the plasma torch remains energized and until the pierce hole is produced, the pierce hole being produced when the plasma arc pierces through the bottom surface of the workpiece.

3. The method of forming a pierce hole according to claim 1, further comprising positioning the plasma torch tip a second height above the top surface of the workpiece before or during the second rotation of the carriage, the second height being less than the first height.

4. The method of forming a pierce hole according to claim 2, further comprising positioning the plasma torch tip a second height above the top surface of the workpiece before or during the one or more additional rotations of the carriage, the second height being less than the first height.

5. The method of forming a pierce hole according to claim 1, wherein the workpiece includes a portion intended to comprise a final work product, the method comprising orienting the carriage to cause the plasma torch tip to face away from the intended final work product throughout the formation of the pierce hole.

6. The method of forming a pierce hole according to claim 1, wherein the second rotation of the carriage causes the cutting axis of the plasma torch to rotate from the second angular position to the third angular position, the first and second angular positions being separated by a first angle and the first and third angular positions being separated by a second angle, the first angle being greater than the second angle.

7. The method of forming a pierce hole according to claim 1, wherein the first rotation of the carriage between the first and second angular positions is at a first rotational rate and the second rotation of the carriage between the first and second angular positions is at a second rotational rate different from the first rotational rate.

8. The method of forming a pierce hole according to claim 6, wherein the first rotation of the carriage between the first and second angular positions is at a first rotational rate and the second rotation of the carriage between the first and second angular positions is at a second rotational rate different than the first rotational rate.

9. The method of forming a pierce hole according to claim 1, further comprising translating the carriage to position the tip of the plasma torch at a second position above the top surface of the workpiece, the second position being different from the first position.

10. The method of forming a pierce hole according to claim 9, the carriage is translated from the first position to the second position after the first rotation of the carriage and/or after the second rotation of the carriage.

11. The method of forming a pierce hole according to claim 2, further comprising translating the carriage to position the tip of the plasma torch at a second position above the top surface of the workpiece, the second position being different from the first position, the carriage being translated from the first position to the second position after the one or more additional rotations of the carriage.

12. The method of forming a pierce hole according to claim 1, wherein as the depth of the pierce hole increases, a cutting current delivered to the plasma torch also increases.

13. The method of forming a pierce hole according to claim 12, wherein as the depth of the pierce hole increases, a flow rate of a process gas delivered and or a shield gas to the plasma torch also increases.

14. A method of forming a pierce hole that extends between a top surface and a bottom surface of a workpiece made of a metal using a plasma torch, the method comprising:
positioning a tip of the plasma torch a first height above a first location of the top surface of the workpiece with a cutting axis of the plasma torch tip oriented orthogonal to the top surface of the workpiece;
energizing the plasma torch to cause a plasma arc to emit from the plasma torch tip and attach to the workpiece to melt the metal and to cause a pressurized ionized process gas of the plasma arc and/or a shield gas exiting the plasma torch tip to propel melted metal away from the plasma torch tip; and
rotating the cutting axis of the plasma torch tip around a designated central axis of the pierce hole in a diametrically reducing manner to cause the plasma arc to produce a funnel-shaped pierce hole with a cross-sectional area of the pierce hole at the top surface of the workpiece being greater than a cross-sectional area of the pierce hole at the bottom surface of the workpiece.

15. The method according to claim 14, wherein the tip of the plasma torch is advanced below the first height as the plasma torch tip is rotated.

16. The method according to claim 14, wherein the plasma torch tip is rotated in a spiral manner about the designated central axis of the pierce hole.

17. The method according to claim 15, wherein the plasma torch tip is rotated in a spiral manner about the designated central axis of the pierce hole.

18. The method according to claim 14, wherein when the plasma torch is energized a current and a process gas at a flow rate are delivered to the plasma torch, and thereafter as a depth of the pierce hole is increased, increasing one or both of the current and the flow rate of the process gas to the plasma torch.

19. The method according to claim 14, wherein when the plasma torch is energized, the shield gas is delivered to the plasma torch at a flow rate, and thereafter, as a depth of the pierce hole is increased, increasing the shield gas flow rate.

20. A method of forming a pierce hole that extends between a top surface and bottom surface of a workpiece made of a metal using a plasma torch, the method comprising:
positioning a tip of the plasma torch a first height above a first location of the top surface of the workpiece with a cutting axis of the plasma torch tip oriented non-orthogonal to the top surface of the workpiece;
energizing the plasma torch to cause a plasma arc to emit from the plasma torch tip and attach to the workpiece to melt the metal and to cause a pressurized process gas and/or shield gas exiting the plasma torch tip to propel melted metal away from the plasma torch tip; and
rotating the cutting axis of the plasma torch tip around a designated central axis of the pierce hole in a diametrically reducing manner to cause the plasma arc to produce a funnel-shaped pierce hole with a cross-sectional area of the pierce hole at the top surface of the workpiece being greater than a cross-sectional area of the pierce hole at the bottom surface of the workpiece.

21. The method according to claim 20, wherein the tip of the plasma torch is advanced below the first height as the tip is rotated.

22. The method according to claim 20, wherein the plasma torch tip is rotated in a spiral manner about the designated central axis of the pierce hole.

23. The method according to claim 21, wherein the plasma torch tip is rotated in a spiral manner about the designated central axis of the pierce hole.

24. The method according to claim 20, wherein an angular orientation of the cutting axis of the plasma torch tip is altered while rotating the plasma torch tip around the designated central axis of the pierce hole.

25. The method according to claim 20, wherein when the plasma torch is energized a current and a process gas at a flow rate are delivered to the plasma torch, and thereafter as a depth of the pierce hole is increased, increasing one or both of the current and the flow rate of the process gas to the plasma torch.

* * * * *